United States Patent

[11] 3,613,498

| [72] | Inventors | Rolf Riccius<br>Worpswede;<br>Gunter Weitkamp, Bremen, both of Germany |
|---|---|---|
| [21] | Appl. No. | 789,516 |
| [22] | Filed | Jan. 7, 1969 |
| [45] | Patented | Oct. 19, 1971 |
| [73] | Assignee | Vereinigte Flugtechnische Werke Gesellschaft mit beschrankter Haftung fruher "Weser" Flugzeugbau/Focke-Wulf/Heinkel-Flugzeugbau Bremen, Germany |

[54] APPARATUS FOR LOADING ON AN AIRPLANE GOODS TO BE DROPPED OFF OR TILTED OUT OF THE PLANE
1 Claim, 7 Drawing Figs.

[52] U.S. Cl. .................................................. 89/1.5 R, 244/129 D, 244/138 R
[51] Int. Cl. ........................................................ F41f 5/02
[50] Field of Search ............................................. 89/1.5, 244, 137, 129, 129 D

[56] References Cited
UNITED STATES PATENTS

| 3,216,322 | 11/1965 | Wenger et al. | 89/1.5 H |
| 2,342,022 | 2/1944 | Trimbach | 89/1.5 H |
| 2,412,729 | 12/1946 | Hall | 89/1.5 H |
| 2,481,501 | 9/1949 | Darnall, Jr. | 89/1.5 H |
| 2,634,656 | 4/1953 | Woolens et al. | 89/1.5 |
| 3,056,335 | 10/1962 | Thieblot et al. | 89/1.5 |

Primary Examiner—Samuel W. Engle
Attorney—Walter Becker

ABSTRACT: An apparatus for loading loads on an airplane which are releasable from the airplane when the latter is in flight, which includes frame means detachably arranged in a loading chamber in the fuselage of an airplane preferably within the region of the center of gravity of the airplane, while said frame means has displaceably mounted thereon carriage means for suspending a load thereon, said carriage means being adapted to be locked to said frame means in a desired position of said carriage means on said frame means.

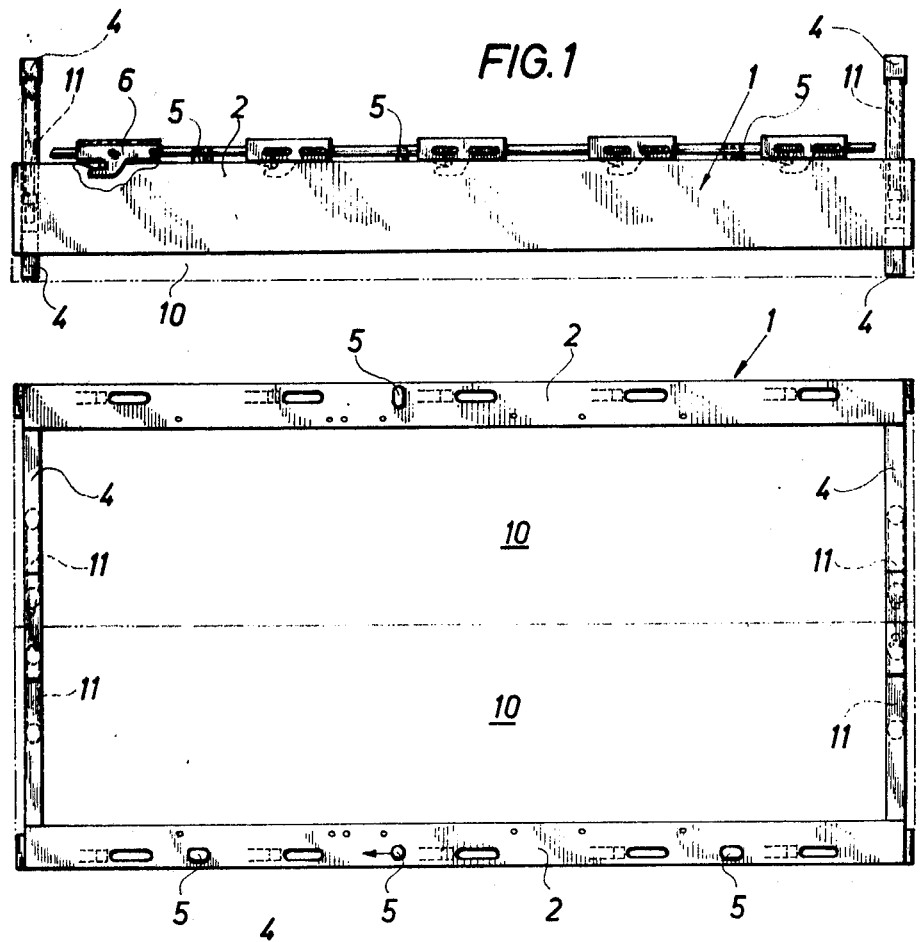

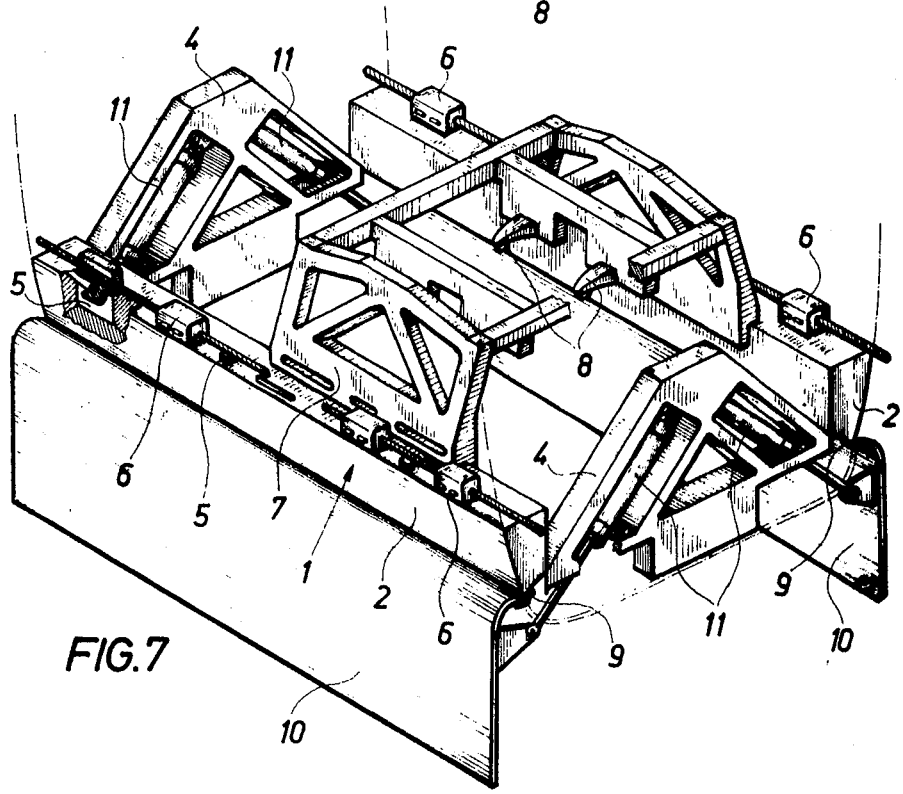

APPARATUS FOR LOADING ON AN AIRPLANE GOODS TO BE DROPPED OFF OR TILTED OUT OF THE PLANE

The present invention relates to an apparatus for loading on an airplane goods to be dropped off or tilted out of the airplane.

With heretofore known airplanes, the ceilings and floors of the loading spaces are equipped with a number of connecting devices, for instance, bomb locks. After the airplane had dropped its loads and had to be reloaded with the same kind of load and weapons, the suspension and fastening of the weapons could be carried out in a relatively short time because the locking devices and pertaining connecting means were still at the respective same places.

However, when the airplane had to be equipped with a different kind of weapons or loads, the loading of such weapons and goods took a considerable time, for instance if the airplane had to be equipped with drop loads, particularly special weapons, instead of the previously used board cannons. In such instances it was necessary to install safety devices, feeding lines and fastening or connecting means either in a different location or to install additionally such devices, and is was also necessary to connect and check such devices. Aside from the resulting additional work, this procedure is particularly disadvantageous because the airplane is not ready for immediate takeoff while this work is being done.

It is, therefore, an object of the present invention to provide an apparatus which will make it possible quickly and without time consuming installation work to mount different types of weapons in an airplane so that the airplane will again be ready for takeoff in a minimum of time.

It is also an object of the present invention to provide an apparatus as set forth in the preceding paragraph for loading an airplane with drop loads or loads to be tilted out of the airplane, which will be able to be loaded with the respective goods in installed condition, i.e. when the apparatus is in the airplane, and also when it is outside the airplane, i.e. on the ground.

These and other objects and advantages of the invention will appear more clearly from the following specification in connection with the accompanying drawings, in which:

FIG. 1 shows a side view of a frame according to the present invention.

FIG. 2 is a top view of the frame of FIG. 1.

FIG. 3 is a front view of the frame according to the invention.

FIG. 4 represents a side view of a carriage with suspended drop load, said carriage being arranged on the frame.

FIG. 5 is an end view of FIG. 4.

FIG. 6 shows a top view of FIG. 4.

FIG. 7 is an isometric view of the entire device without suspended loads.

The apparatus according to the present invention is characterized primarily by a frame which is detachably connected to the fuselage, preferably within the region of the center of gravity of the fuselage, said frame having arranged thereon at least one carriage for carrying the loads which carriage is displaceable on the frame and can be locked in any position thereon.

The loads supported by the carriage may be suspended in locks which are displaceable on the carriage and by means of which a fast locking can be effected in any position of the carriage.

To the bottom side of at least one longitudinal girder, preferably however, at the bottom sides of both longitudinal girders, there may be linked at least one flap or gate which is operable, for instance, by a hydraulic cylinder piston system, said flap in folded-up position principally covering the hatch and fitting into the streamlined contour of the airplane.

The frame and the carriage or carriages may be equipped with fixedly installed supply lines, as for instance hydraulic hoses, electric cables, and tackles with fast coupling elements, while the said supply lines represent a continuation of the lines installed in the airplane fuselage and leading to the loading hatches and locks of the loading space opening.

For purposes of detaching the frame from the airplane, a fast-locking mechanism may be provided. This fast-locking mechanism when actuated may establish or interrupt the connection of the joints of the supply lines in the frame with the corresponding supply lines in the fuselage.

For purposes of locking the carriage or carriages to the frame, a fast-closing device may be provided which simultaneously establishes the connection of the supply lines installed in the carriage with the lines provided in the frame.

Referring now more specifically to the drawings, the device illustrated therein comprises a frame 1 consisting of girders of a box-shaped profile and being installed in the airplane in such a way that its center of gravity in loaded as well as in nonloaded condition is located within the area of the center of gravity of the airplane so that the stability and control of the airplane will hardly be affected by the loading conditions. The frame 1 in its turn comprises two longitudinal girders 2 which simultaneously serve as guiding rails 3 and furthermore comprises at least two transverse struts 4. The said frame 1 has a plurality of centering and receiving means 5 by means of which it can be connected in the supporting means for the device by a fast lock or snap closure 6. When actuating the snap lock 6, simultaneously the connections between the hydraulic and electrical systems of the airplane and the frame 1 are connected to or disconnected from each other. The frame is elastic to a limited extent only so as to be able to yield to possible deformations of the airplane fuselage.

Arranged on the rails 3 is a movable carriage 7 which by means of a nonillustrated snap closure is adapted to be locked in any desired position on the rails 3. This snap lock or closure when actuated will also be able to establish the connection between the hydraulic and electrical parts of the frame 1 and the carriage 7. The carriage 7 is provided with a plurality of suspension locks 8 arranged adjacent to each other and one behind the other. These suspension locks 8 are adapted by means of a nonillustrated fast-lock or snap closure to be connected to the carriage 7 in any desired position.

By means of fittings 9, tiltable flaps or gates 10 are connected to the bottom sides of the longitudinal girders 2. These flaps 10 when in closing position close the loading space while fitting into the streamlined contour of the airplane. However, any desired shape of the flaps is possible, even such shape which somewhat protrudes from the streamlined contour of the airplane. In closed condition, the flaps 10 engage the transverse struts 4 while at these areas sealing strips (not shown in the drawings) may be provided. Depending on the size and the purpose of the airplane, additional transverse struts may be located between the illustrated transverse struts 4. These additional struts as well as the transverse struts 4 may have inserted thereinto fluid operable cylinder piston systems 11 for actuating the flaps 10 if it is desired to tilt the flaps individually and the flaps are subdivided for this purpose.

In the suspension locks various types of loads may be suspended, as for instance drop loads or loads which are to be tilted outwardly, and also auxiliary tanks.

If it is desired to reload an airplane after it has discarded its load, the entire device is by means of the snap lock 6 separated from the airplane and another device which was previously prepared and loaded on the ground is put into the airplane. In this way, the loading time can be reduced to a minimum. A reloading of the airplane is, of course, also possible without removing the respective device therefrom. In other words, the new loads can directly be put into the device installed in the airplane.

It is, of course, to be understood that the present invention is, by no means, limited to the particular structure shown in the drawings but also comprises modifications within the scope of the appended claims.

What we claim is:

1. An apparatus in combination for quickly loading goods of differing size onto an airplane fuselage with a loading chamber from which they are to be released during the flight of the airplane, a loading rack which includes: frame means arranged in a loading chamber and detachably connectable to the fuselage interior of an airplane and adapted to have a load of variable size suspended thereon, carriage means displaceably movable longitudinally of the airplane fuselage on said frame means for releasably receiving the load to be released from the airplane fuselage in flight, main locking means associated with said carriage means and operable to selectively lock said carriage means at any desired position to said frame means, additional quick-locking means displaceable transverse to airplane fuselage longitudinal axis as arranged on said carriage means also for suspending the load held thereon, means associated with said additional quick-locking means for locking the latter anywhere at the desired respective position on said carriage means, said frame means having a load release opening and including girder means extending in the longitudinal direction of said frame means, gate means hingedly connected to said girder means and operable selectively to open and close said loading chamber release opening of said frame means, power operable means operatively connected to said gate means for actuating the same, energy-conveying means fixedly arranged and extending at least into the fuselage with the loading chamber and connectable to corresponding energy-conveying means in the airplane fuselage to which said frame is to be connected.